United States Patent
Yokoji et al.

(10) Patent No.: US 12,062,758 B2
(45) Date of Patent: Aug. 13, 2024

(54) BATTERY, BATTERY PACK, ELECTRONIC DEVICE, ELECTRIC VEHICLE, AND ELECTRIC POWER SYSTEM

(71) Applicant: MURATA MANUFACTURING CO., LTD., Kyoto (JP)

(72) Inventors: Takato Yokoji, Kyoto (JP); Hiroki Mita, Kyoto (JP); Kazumasa Takeshi, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 534 days.

(21) Appl. No.: 17/360,156

(22) Filed: Jun. 28, 2021

(65) Prior Publication Data
US 2021/0328265 A1    Oct. 21, 2021

Related U.S. Application Data

(63) Continuation of application No. PCT/JP2019/051196, filed on Dec. 26, 2019.

(30) Foreign Application Priority Data

Dec. 28, 2018 (JP) .................. 2018-248301

(51) Int. Cl.
 *H01M 10/0565* (2010.01)
 *H01M 10/0525* (2010.01)
 *H01M 10/42* (2006.01)

(52) U.S. Cl.
 CPC ... *H01M 10/0565* (2013.01); *H01M 10/0525* (2013.01); *H01M 10/425* (2013.01); *H01M 2220/20* (2013.01)

(58) Field of Classification Search
 None
 See application file for complete search history.

(56) References Cited

U.S. PATENT DOCUMENTS

| | | | |
|---|---|---|---|
| 2013/0089794 A1 | 4/2013 | Kim | |
| 2016/0101708 A1* | 4/2016 | Zhang | H02J 7/0049 320/128 |
| 2016/0344067 A1* | 11/2016 | Laramie | B05D 1/12 |
| 2017/0263977 A1* | 9/2017 | Jeon | H01M 10/0565 |
| 2017/0274794 A1* | 9/2017 | Tenmyo | B60W 10/26 |
| 2018/0337426 A1 | 11/2018 | Matsumoto et al. | |

FOREIGN PATENT DOCUMENTS

| | | |
|---|---|---|
| CN | 103265721 | 8/2013 |
| JP | H10289617 A | 10/1998 |
| JP | 2000173655 A | 6/2000 |

(Continued)

OTHER PUBLICATIONS

Japanese Office Action issued Aug. 9, 2022 in corresponding Japanese Application No. 2020-562425.

(Continued)

*Primary Examiner* — Scott J. Chmielecki
(74) *Attorney, Agent, or Firm* — K&L Gates LLP

(57) ABSTRACT

A battery includes a cathode, an anode, and an electrolyte layer, and the electrolyte layer includes an electrolytic solution, a first polymeric compound configured to retain the electrolytic solution, and inorganic particles configured to retain a compound having a polar group on a surface.

10 Claims, 7 Drawing Sheets

(56) References Cited

FOREIGN PATENT DOCUMENTS

| | | |
|---|---|---|
| JP | 2002008724 A | 1/2002 |
| JP | 2004189918 | 7/2004 |
| JP | 2007311151 | 11/2007 |
| JP | 2013084598 A | 5/2013 |
| WO | 2012073996 | 5/2014 |
| WO | 2013099607 | 4/2015 |
| WO | 2016136924 A1 | 9/2016 |
| WO | 2017191679 | 11/2018 |

OTHER PUBLICATIONS

International Search Report for Application No. PCT/JP2019/051196, dated Mar. 17, 2020.
Japanese Office Action issued May 24, 2022 in corresponding Japanese Application No. 2020-562425.
Chinese Office Action issued Jan. 15, 2024 in corresponding Chinese Application No. 201980086812.3.

* cited by examiner

BATTERY, BATTERY PACK, ELECTRONIC DEVICE, ELECTRIC VEHICLE, AND ELECTRIC POWER SYSTEM

CROSS REFERENCE TO RELATED APPLICATIONS

The present application is a continuation of PCT patent application no. PCT/JP2019/051196, filed on Dec. 26, 2019, which claims priority to Japanese patent application no. JP2018-248301 filed on Dec. 28, 2018, the entire contents of which are being incorporated herein by reference.

BACKGROUND

The present technology generally relates to a battery, a battery pack, an electronic device, an electric vehicle, and an electric power system.

In recent years, various studies for improving battery characteristics have been made for batteries in which an electrolyte layer containing an electrolytic solution, a polymeric compound and inorganic particles is used.

SUMMARY

The present technology generally relates to a battery, a battery pack, an electronic device, an electric vehicle, and an electric power system.

Recently, batteries are used as power sources for various electronic devices, electric automobiles and so on, and further improvement in characteristics is requested. In batteries in which an electrolyte layer is used, improvement in storage characteristics and float characteristics is requested.

It is an object of the present technology to provide a battery, a battery pack, an electronic device, an electric vehicle, and an electric power system capable of improving storage characteristics and float characteristics.

According to an embodiment of the present technology, a battery is provided. The battery includes a cathode, an anode, and an electrolyte layer, and the electrolyte layer includes an electrolytic solution, a first polymeric compound configured to retain the electrolytic solution, and inorganic particles configured to retain a compound having a polar group on a surface.

According to an embodiment of the present technology, a battery pack is provided. The battery pack includes the battery according to the embodiments as described herein, and a controller that controls the battery.

According to an embodiment of the present technology, an electronic device is provided. The electronic device includes the battery according to the embodiments as described herein, and is configured to be supplied with electric power from the battery.

According to an embodiment of the present technology, an electric vehicle is provided. The electric vehicle includes the battery according to the embodiments as described herein, and a converter that converts electric power supplied from the battery to a driving force of the electric vehicle.

According to an embodiment of the present technology, an electronic power system is provided. The electronic power system includes the battery according to the embodiments as described herein, and is configured to be supplied with electric power from the battery.

According to the present technology, it is possible to improve the storage characteristics and the float characteristics. It should be understood that the effects described in the present specification are only examples, which do not impose limitations, and additional effects may be further provided.

DETAILED DESCRIPTION

In the present description, the numerical range described by "A to B" indicates the range including A and B, respectively as the minimum value and the maximum value of the range. In the numerical range described stepwise in the present description, the upper limit and the lower limit of a numerical range of a certain step may be replaced by the upper limit and the lower limit of a numerical range of other step. Unless otherwise noted, the materials exemplified in the present description may be used alone or in combination of two or more kinds.

As described herein, the present disclosure will be described based on examples with reference to the drawings, but the present disclosure is not to be considered limited to the examples, and various numerical values and materials in the examples are considered by way of example.

Figure 1:
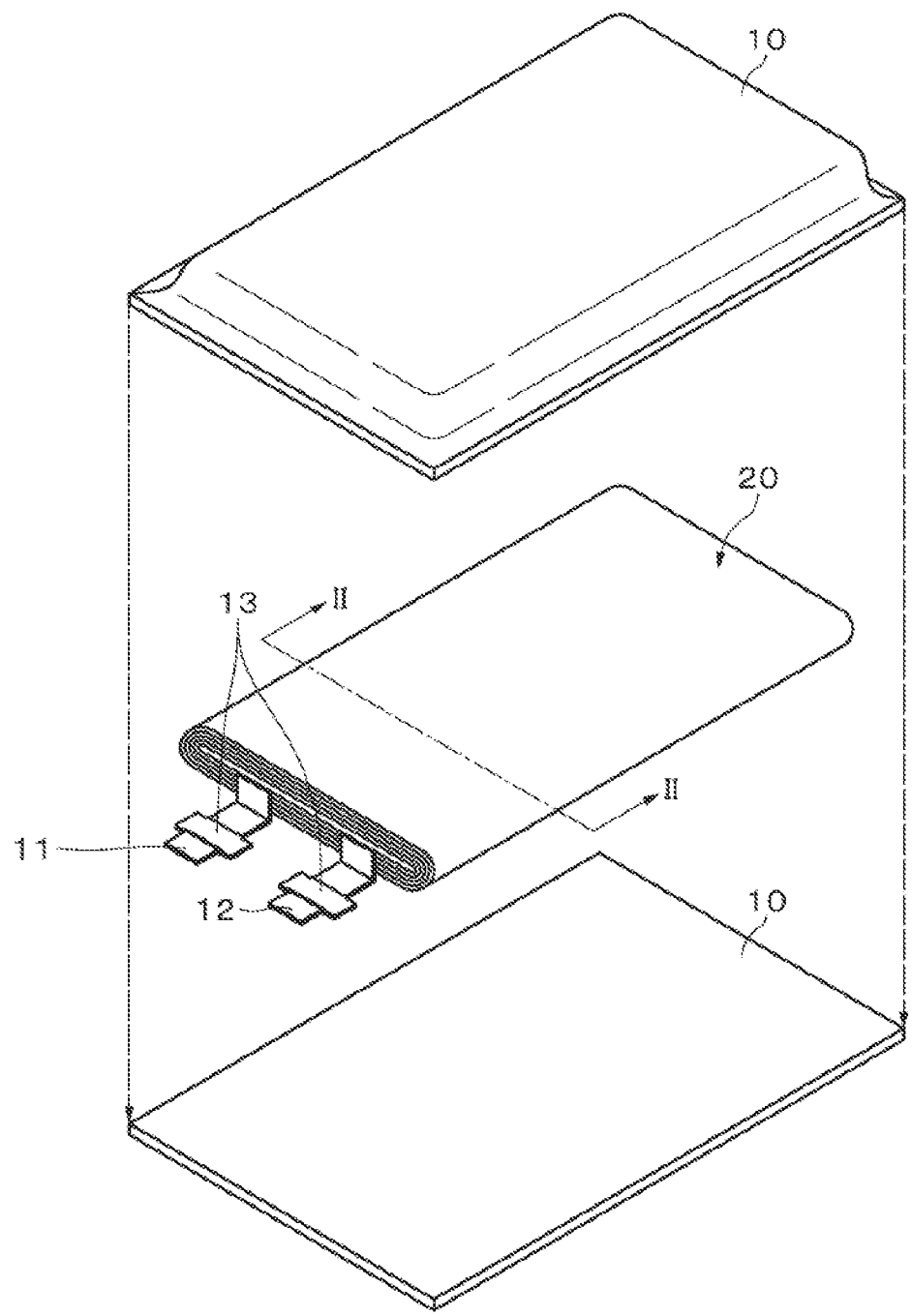
FIG. 1 is an exploded perspective view showing one exemplary configuration of a nonaqueous electrolyte secondary battery according to an embodiment of the present technology.

FIG. 1 shows one exemplary configuration of a non-electrolyte secondary battery (hereinafter, simply called "battery") according to one embodiment of the present technology. The battery is a so-called laminate-type battery, and includes a winding-type electrode body 20 to which a cathode lead 11 and an anode lead 12 are attached, and a film-like packaging material 10 that accommodates the electrode body 20, and enables miniaturization, weight reduction and slimming down.

The cathode lead 11 and the anode lead 12 each run from the inside toward the outside of the packaging material 10, and are led out, for example, in the same direction. Each of the cathode lead 11 and the anode lead 12 is formed into a sheet form or a mesh form with a metallic material such as Al, Cu, Ni or stainless steel.

The packaging material 10 is configured, for example, by a rectangular aluminum laminate film in which a nylon film, an aluminum foil and a polyethylene film are bonded together in this sequence. The packaging material 10 is disposed such that the polyethylene film side and the electrode body 20 are opposed to each other, and outer edge parts are brought into close contact with each other by fusion or by an adhesive. Between the packaging material 10, and the cathode lead 11 and the anode lead 12, a close contact film 13 is inserted to inhibit entry of the outside air. The close contact film 13 is configured by a material having close adherence with the cathode lead 11 and the anode lead 12, for example, a polyolefin resin such as polyethylene, polypropylene, modified polyethylene or modified polypropylene.

The packaging material 10 may be configured by a laminate film having other structure, a polymeric film of polypropylene or the like, or a metallic film in place of the above-mentioned aluminum laminate film. Alternatively, the packaging material may be configured by a laminate film prepared by laminating a polymeric film on either or both sides of a core aluminum film.

Figure 2:
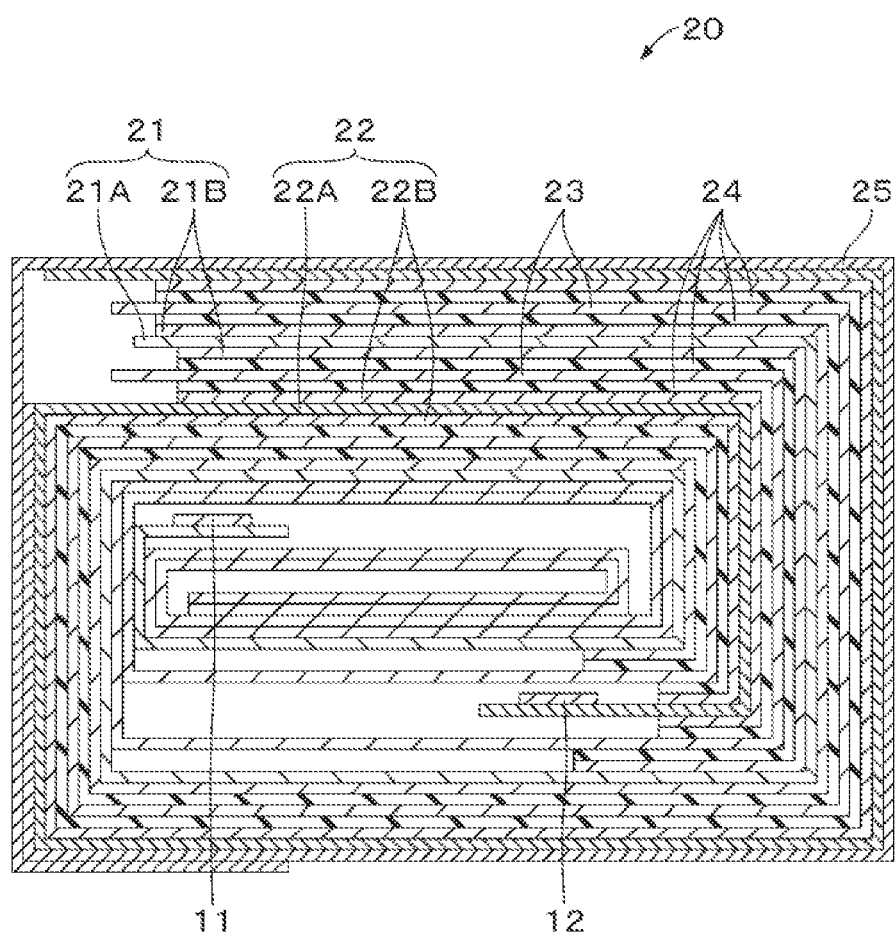
FIG. 2 is a sectional view along the line II-II of FIG. 1.

FIG. 2 is a sectional view along the line II-II of the electrode body 20 shown in FIG. 1. The electrode body 20 includes a cathode 21 having a long shape, an anode 22 having a long shape, a separator 23 having a long shape, disposed between the cathode 21 and the anode 22, and an electrolyte layer 24 disposed between the cathode 21 and the separator 23, and between the anode 22 and the separator 23. The electrode body 20 has such a configuration that the cathode 21 and the anode 22 are laminated with the separator 23 and the electrolyte layer 24 interposed there between, and the laminate is wounded in the longitudinal direction to give a flat and spiral shape, and the outermost periphery is protected with a protective tape 25.

Hereinafter, the cathode 21, the anode 22, the separator 23 and the electrolyte layer 24 that constitute the battery are sequentially described.

The cathode 21 includes, for example, a cathode collector 21A, and a cathode active material layer 21B disposed on both sides of the cathode collector 21A. The cathode collector 21A is configured, for example, by a metallic foil such as an aluminum foil, a nickel foil or a stainless foil. The cathode active material layer 21B contains one or two or more kinds of cathode active materials capable of occluding and releasing lithium. The cathode active material layer 21B may further contain at least one of a binder and a conducting agent as necessary.

Appropriate examples of the cathode active material include lithium-containing compounds such as lithium oxides, lithium phosphates, lithium sulfides and intercalation compounds containing lithium, and a mixture of two or more of these compounds may be used. In order to increase the energy density, a lithium-containing compound containing lithium, a transition metal element and oxygen is preferred. Examples of the lithium-containing compound include lithium composite oxides having a bedded salt type structure represented by a formula (A) and lithium composite phosphates having an olivine type structure represented by a formula (B). As the lithium-containing compound, those containing at least one selected from the group consisting of Co, Ni, Mn and Fe as the transition metal element are more preferred. Examples of such a lithium-containing compound include lithium composite oxides having a bedded salt type structure represented by a formula (C), a formula (D) or a formula (E), lithium composite oxides having a spinel type structure represented by a formula (F), and lithium composite phosphates having an olivine type structure represented by a formula (G), and specific examples of the lithium-containing compound include $LiNi_{0.50}Co_{0.20}Mn_{0.30}O_2$, $LiCoO_2$, $LiNiO_2$, $LiNiaCo_{1-a}O_2$ (0<a<1), $LiMn_2O_4$ and $LiFePO_4$.

$$Li_pNi_{(1-q-r)}Mn_qM1_rO_{(2-y)}X_z \qquad (A)$$

(In the formula (A), M1 represents at least one selected from elements of group 2 to group 15 excluding Ni and Mn. X represents at least one selected from elements of group 16 and group 17 excluding oxygen. p, q, y, and z are values within the following ranges: 0≤p≤1.5, 0≤q≤1.0, 0≤r≤1.0, −0.10≤y≤0.20, and 0≤z≤0.2.)

$$Li_aM2_bPO_4 \qquad (B)$$

(In the formula (B), M2 represents at least one selected from elements of group 2 to group 15. a and b are values within the following ranges: 0≤a≤2.0, and 0.5≤b≤2.0.)

$$Li_fMn_{(1-g-h)}Ni_gM3_hO_{(2-j)}F_k \qquad (C)$$

(In the formula (C), M3 represents at least one selected from the group consisting of Co, Mg, Al, B, Ti, V, Cr, Fe, Cu, Zn, Zr, Mo, Sn, Ca, Sr and W. f, g, h, j and k are values within the ranges: 0.8≤f≤1.2, 0<g<0.5, 0≤h≤0.5, g+h<1, −0.1≤j≤0.2, and 0≤k≤0.1. The composition of lithium varies depending on the charge and discharge state, and the value of f represents the value in the fully discharged state.)

$$Li_mN_{(1-n)}M4_nO_{(2-p)}F_q \qquad (D)$$

(In the formula (D), M4 represents at least one selected from the group consisting of Co, Mn, Mg, Al, B, Ti, V, Cr, Fe, Cu, Zn, Mo, Sn, Ca, Sr and W. m, n, p and q are values within the ranges: 0.8≤m≤1.2, 0.005≤n≤0.5, −0.1≤p≤0.2, and 0≤q≤0.1. The composition of lithium varies depending on the charge and discharge state, and the value of m represents the value in the fully discharged state.)

$$Li_rCo_{(1-s)}M5_sO_{(2-t)}F_u \qquad (E)$$

(In the formula (E), M5 represents at least one selected from the group consisting of Ni, Mn, Mg, Al, B, Ti, V, Cr, Fe, Cu, Zn, Mo, Sn, Ca, Sr and W. r, s, t and u are values within the ranges: 0.8≤r≤1.2, 0≤s<0.5, −0.1≤t≤0.2, and 0≤u≤1. The composition of lithium varies depending on the charge and discharge state, and the value of r represents the value in the fully discharged state.)

$$Li_vMn_{2-w}M6_wO_xF_y \qquad (F)$$

(In the formula (F), M6 represents at least one selected from the group consisting of Co, Ni, Mg, Al, B, Ti, V, Cr, Fe, Cu, Zn, Mo, Sn, Ca, Sr and W. v, w, x and y are values within the ranges: 0.9≤v≤1.1, 0≤w≤0.6, 3.7≤x≤4.1, and 0≤y≤0.1. The composition of lithium varies depending on the charge and discharge state, and the value of v represents the value in the fully discharged state.)

$$Li_zM7PO_4 \qquad (G)$$

(In the formula (G), M7 represents at least one selected from the group consisting of Co, Mg, Fe, Ni, Mg, Al, B, Ti, V, Nb, Cu, Zn, Mo, Ca, Sr, W and Zr. z is a value within the range of 0.9≤z≤1.1. The composition of lithium varies depending on the charge and discharge state, and the value of z represents the value in the fully discharged state.)

As the cathode active material capable of occluding and releasing lithium, an inorganic compound free of lithium, such as $MnO_2$, $V_2O_5$, $V_6O_{13}$, NiS, or MoS besides those recited above may be used.

The cathode active material capable of occluding and releasing lithium may be other materials than those mentioned above. Two or more kinds of those exemplified above as the cathode active material may be mixed in any combination.

As the binder, for example, at least one selected from the group consisting of polyvinylidene fluoride, polytetrafluoroethylene, polyacrylonitrile, styrene butadiene rubber, carboxymethyl cellulose, and copolymers based on one of these resin materials may be used.

As the conducting agent, for example, at least one carbon material selected from the group consisting of graphite, carbon fiber, carbon black, acetylene black, Ketjen black, carbon nanotube, and graphene may be used. The conducting agent is not limited to carbon materials as long as the conducting agent is a material having conductivity. For example, as the conducting agent, a metallic material, a conductive polymeric material or the like may be used. Examples of the shape of the conducting agent include, but are not particularly limited to, a granular shape, a scaly shape, a hollow shape, a needle shape and a tubular shape.

The anode 22 includes, for example, an anode collector 22A, and an anode active material layer 22B disposed on both sides of the anode collector 22A. The anode collector 22A is configured, for example, by a metallic foil such as a copper foil, a nickel foil or a stainless foil. The anode active material layer 22B contains one or two or more kinds of anode active materials capable of occluding and releasing lithium. The anode active material layer 22B may further contain at least one of a binder and a conducting agent as necessary.

In the battery, it is preferred that the electrochemical equivalent of the anode 22 or the anode active material is larger than the electrochemical equivalent of the cathode 21, and, in theory, lithium metal will not precipitate on the anode 22 during charging.

Examples of the anode active material include carbon materials such as nongraphitizable carbon, graphitizable carbon, graphite, pyrolytic carbons, coke, glassy carbons, a fired body of organic polymeric compound, carbon fiber and activated charcoal. Coke includes pitch coke, needle coke and petroleum coke. A fired body of organic polymeric compound means a polymeric material such as phenol resin or furan resin that is carbonated by firing at an appropriate temperature, and is partly classified into nongraphitizable carbon or graphitizable carbon. These carbon materials are preferred because change in the crystal structure occurring during charge and discharge is very small, a high charge and discharge capacity can be obtained, and excellent cycle characteristics can be obtained. Graphite is particularly preferred because high energy density can be obtained owing to the large electrochemical equivalent. Nongraphitizable carbon is preferred because excellent cycle characteristics are obtained.

Those having a low charge and discharge electric potential, specifically those having a charge and discharge electric potential approximate to that of lithium metal are preferred because energy densification of the battery can be easily realized.

Examples of other anode active material capable of increasing the capacity include materials containing at least one of a metallic element and a metalloid element as a constituent element (e.g., alloy, compound or mixture). This is because high energy density can be obtained by using such a material. In particular, it is preferred to use with a carbon material because high energy density can be obtained, and excellent cycle characteristics can be obtained. In the present technology, alloys include those composed of one or more metallic elements and one or metalloid elements, in addition to those composed of two or more metallic elements. Also, a non-metallic element may be contained. The structure can be a solid solution, an eutectic (eutectic mixture), an intermetallic compound, or coexistence of two or more of these.

Examples of such an anode active material include metallic elements or metalloid elements capable of forming alloys with lithium. Specific examples include Mg, B, Al, Ti, Ga, In, Si, Ge, Sn, Pb, Bi, Cd, Ag, Zn, Hf, Zr, Y, Pd and Pt. These may be crystalline or amorphous.

Examples of such an anode active material include those containing a 4B group metallic element or a metalloid element as a constituent element, with those containing at least one of Si and Sn as a constituent element being preferred.

This is because Si and Sn have high ability to occlude and release lithium, and high energy density can be obtained. Examples of such an anode active material include a simple substance, an alloy or a compound of Si, a simple substance, an alloy or a compound of Sn, and materials having one or two or more of these at least partly.

Examples of an alloy of Si include those containing at least one selected from the group consisting of Sn, Ni, Cu, Fe, Co, Mn, Zn, In, Ag, Ti, Ge, Bi, Sb, Nb, Mo, Al, P, Ga and Cr as a second constituent element other than Si. Examples of an alloy of Sn include those containing at least one selected from the group consisting of Si, Ni, Cu, Fe, Co, Mn, Zn, In, Ag, Ti, Ge, Bi, Sb, Nb, Mo, Al, P, Ga and Cr as a second constituent element other than Sn.

Examples of a compound of Sn or a compound of Si include those containing O or C as a constituent element. These compounds may contain the above-mentioned second constituent element.

Among these, it is preferred that an Sn-based anode active material contains Co, Sn, and C as constituent elements, and has a low crystalline or amorphous structure.

Examples of other anode active material include a metal oxide or a polymeric compound capable of occluding and releasing lithium. Examples of the metal oxide include lithium titanium oxide containing Li and Ti such as lithium titanate ($Li_4Ti_5O_{12}$), iron oxide, ruthenium oxide and molybdenum oxide. Examples of the polymeric compound include polyacetylene, polyaniline and polypyrrole.

As a binder, those described for the cathode active material layer 21B may be used.

As a conducting agent, those described for the cathode active material layer 21B may be used.

The separator 23 is an insulating porous film that insulates the cathode 21 and the anode 22 from each other to prevent a short circuit caused by the contact between the cathode and the anode, while transmitting lithium ions. Since holes of the separator 23 retain an electrolytic solution, it is preferred that the separator 23 has the characteristics of high resistance to the electrolytic solution, low reactivity, and poor expandability.

The separator 23 is configured by a porous film formed, for example, of polytetrafluoroethylene, a polyolefin resin (polypropylene (PP) or polyethylene (PE), etc.), an acrylic resin, a styrene resin, a polyester resin, a nylon resin, or a blended resin of these resins, and may have such a structure that these two or more porous films are laminated.

Among these, a porous film of polyolefin is preferred because the porous film is excellent in short circuit preventive effect, and is capable of improving the safety of the battery by shutdown effect. Especially, polyethylene is preferred as a material constituting the separator 23 because a shutdown effect is obtained at a temperature ranging from 100° C. to 160° C., inclusive, and polyethylene is excellent in electrochemical stability. Among these, low density polyethylene, high density polyethylene, and linear polyethylene are preferably used because they have an appropriate melting temperature and they are easy to obtain. Besides the above, a material obtained by copolymerizing or blending a resin having chemical stability with polyethylene or polypropylene may be used. Alternatively, the porous film may have a structure of three or more layers obtained by sequentially laminating a polypropylene layer, a polyethylene layer and a polypropylene layer. The separator 23 may be manufactured in a wet method or a dry method.

As the separator 23, nonwoven fabric may be used. As fibers that form nonwoven fabric, aramid fiber, glass fiber, polyolefin fiber, polyethylene terephthalate (PET) fiber, nylon fiber and the like may be used. Two or more kinds of these fibers may be mixed to form nonwoven fabric.

The electrolyte layer 24 contains an electrolytic solution, a polymeric compound that is to be a retainer for retaining the electrolytic solution, and inorganic particles retaining a compound having one or two or more polar groups on a surface. Containing the inorganic particles in the electrolyte layer 24 makes it possible to improve the strength, the oxidation resistance, the heat resistance and the like of the electrolyte layer 24. Retaining the compound having one or two or more polar groups on the surface makes it possible to improve the dispersibility of inorganic particles in the step of forming the electrolyte layer 24. Therefore, it is possible to suppress unevenness in the concentration of inorganic particles in the electrolyte layer 24, and thus, it is possible to improve the battery characteristics such as storage characteristics and float characteristics. It is preferred that the electrolyte layer 24 has a gel state. When the electrolyte layer 24 has a gel state, high ion conductivity can be obtained, and leakage of the battery can be inhibited.

Here, description is given for the case where both of the electrolyte layer 24 disposed between the cathode 21 and the separator 23, and the electrolyte layer 24 disposed between the anode 22 and the separator 23 contain inorganic particles, however, one of these electrolyte layers 24 may contain inorganic particles. From the viewpoint of improvement in battery characteristics, it is preferred that both of these electrolyte layers 24 contain inorganic particles.

The electrolytic solution is a so-called nonaqueous electrolytic solution, and contains an organic solvent (nonaqueous solvent) and an electrolyte salt dissolved in the organic solvent. The electrolytic solution may contain a known additive so as to improve the battery characteristics.

As the organic solvent, a cyclic carbonate such as ethylene carbonate or propylene carbonate may be used, and it is preferred to use one of ethylene carbonate and propylene carbonate, or in particular, a mixture of both of ethylene carbonate and propylene carbonate. This is because cycle characteristics can be further improved.

As the organic solvent, it is preferred to mix a chained carbonate such as diethyl carbonate, dimethyl carbonate, ethylmethyl carbonate or methylpropyl carbonate in addition to these cyclic carbonates. This is because high ion conductivity can be obtained.

As the organic solvent, it is preferred that 2,4-difluoroanisole or vinylene carbonate is further contained. This is because 2,4-difluoroanisole can further improve the discharge capacity, and vinylene carbonate can further improve the cycle characteristics. Therefore, it is preferred to use 2,4-disorganization and vinylene carbonate in mixture because the discharge capacity and the cycle characteristics can be further improved.

Other examples of the organic solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformaldehyde, N-methylpyrrolidinone, N-methyloxazolidinone, N,N-dimethylimidazolidinone, nitromethane, nitroethane, sulfolane, dimethylsulfoxide and trimethyl phosphate.

Compounds in which at least part of hydrogen of these organic solvents are substituted with fluorine are sometimes preferred because reversibility of the electrode reactivity can be improved depending on the kind of the electrode.

Examples of the electrolyte salt include lithium salts, which may be used solely or in mixture of two or more kinds. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalato borate, and LiBr.

Among these, $LiPF_6$ is preferred because $LiPF_6$ makes it possible to obtain high ion conductivity, and further improves the cycle characteristics.

As the polymeric compound that is to be a retainer for retaining an electrolytic solution (first polymeric compound), for example, at least one selected from the group consisting of a vinylidene fluoride-based polymer, polyacrylonitrile, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene and polycarbonate may be used. Especially from the viewpoint of electrochemical stability, it is preferred to use at least one selected from the group consisting of a vinylidene fluoride-based polymer, polyacrylonitrile, polyhexafluoropropylene and polyethylene oxide among these polymeric compounds, and it is particularly preferred to use a vinylidene fluoride-based polymer. As the vinylidene fluoride-based polymer, it is preferred to use at least one selected from the group consisting of polyvinylidene fluoride (homopolymer of vinylidene fluoride) and a copolymer of vinylidene fluoride and hexafluoropropylene. Part of a side chain or a terminal and the like of the polyvinylidene fluoride-based polymer may be modified.

The inorganic particles have a surface site that is electrically biased positively or negatively.

Since the inorganic particles have the surface site that is electrically biased positively or negatively, the positively or negatively biased site and one or two or more polar groups of the compound interact with each other, so that the compound having the one or two or more polar groups is retained on the surface of the inorganic particles, for example, by adsorption.

It is preferred that the inorganic particles include at least one of inorganic compound particles and metallic particles, and it is particularly preferred that the inorganic particles include inorganic oxide particles. A polar group such as a hydroxy group on the surface of the inorganic oxide particles, and a polar group of the compound form a hydrogen bond, and thus the compound is adsorbed and retained on the surface of the inorganic oxide particles. Here, in definition, metal in the metallic particles includes metalloid.

The inorganic compound particles contain, for example, at least one selected from the group consisting of a metal oxide, a metal nitride, a metal carbide, and a metal sulfide. It is preferred that the metal oxide includes at least one selected from the group consisting of aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$) and yttrium oxide (yttria, $Y_2O_3$). It is preferred that the metal nitride includes at least one selected from the group consisting of silicon nitride ($Si_3N_4$), aluminum nitride (AlN), boron nitride (BN) and titanium nitride (TiN). It is preferred that the metal carbide includes at least one selected from the group consisting of silicon carbide (SiC) and boron carbide ($B_4C$). It is preferred that metal sulfide includes barium sulfate ($BaSO_4$) and the like. At least one selected from the group consisting of porous aluminosilicate such as zeolite ($M_{2/n}O \cdot Al_2O_3 \cdot xSiO_2 \cdot yH_2O$, M is a metallic element. $x \geq 2$, $y \geq 0$), lamellar silicate, and mineral such as barium titanate ($BaTiO_3$) and strontium titanate ($SrTiO_3$) may be contained. Among these, it is preferred that at least one selected from aluminum oxide, titanium oxide (especially, those having a rutile structure), silicon oxide, and magnesium oxide is contained, and it is particularly preferred that aluminum oxide is contained. Metallic particles contain, for example, at least one selected from the group consisting of Ag, Pt, Au, Ni, Cu, Pd, Al, Fe, Co and Si.

Since inorganic particles have oxidation resistance and heat resistance, the electrolyte layer 24 on the lateral side facing the cathode containing the inorganic particles has strong resistance to the oxidizing environment in the vicinity of the cathode during charging. The shape of inorganic particles is not particularly limited, and those having any shapes including globular, platy, fibrous, cubic and random shapes may be used.

An average particle diameter of inorganic particles is preferably 1 nm or more and 1 μm or less. If the average particle diameter of inorganic particles is less than 1 nm, the inorganic particles are difficult to obtain, and are not worth the cost if obtained. On the other hand, inorganic particles having an average particle diameter of 1 μm or less can improve the coating properties of paint for forming the electrolyte layer, and further suppress unevenness in the concentration of inorganic particles in the electrolyte layer 24.

As the compound having one or two or more polar groups, a polymer having one or two or more polar groups (second polymeric compound) is preferably used from the viewpoint of improving the dispersibility of inorganic particles in the step of forming the electrolyte layer 24. The polar group is, for example, at least one selected from the group consisting of a carboxylic group, a phosphoric group, a sulfonic group, a carboxylate group, a phosphate group, a sulfonate group, an amide group, an amino group, a hydroxy group and an ether group. From the viewpoint of improving the storage characteristics, the polar group is preferably at least one selected from the group consisting of a carboxylic group and a carboxylate group among these polar groups.

The polymer may be a homopolymer or a copolymer. The lower limit of the weight average molecular weight of the polymer is preferably 30000 or more, more preferably 300000 or more, further preferably 500000 or more, particularly preferably 900000 or more from the viewpoint of improving the dispersibility of inorganic particles in the step of forming the electrolyte layer 24. The upper limit of the weight average molecular weight of the polymer is preferably 2000000 or less from the viewpoint of the solubility in the electrolytic solution. The weight average molecular weight is determined by gel permeation chromatography.

As the polymer, for example, at least one polymer selected from the group consisting of a vinylidene fluoride-based polymer, an acrylonitrile-based polymer and a polyether-based polymer, having one or two or more groups substituted with a polar group may be used.

Examples of the vinylidene fluoride-based polymer include at least one selected from the group consisting of polyvinylidene fluoride (homopolymer of vinylidene fluoride), vinylidene fluoride-hexafluoropropylene copolymer, vinylidene fluoride-ethylene copolymer, vinylidene fluoride-monofluoroethylene copolymer, vinylidene fluoride-trifluoroethylene copolymer, vinylidene fluoride-tetrafluoroethylene copolymer, and vinylidene fluoride-hexafluoropropylene-tetrafluoroethylene terpolymer.

Examples of the acrylonitrile-based polymer include at least one selected from the group consisting of acrylonitrile-methylmethacrylate copolymer, acrylonitrile-methylacrylate copolymer, acrylonitrile-ethylmethacrylate copolymer, acrylonitrile-ethylacrylate copolymer, acrylonitrile-methacrylic acid copolymer, acrylonitrile-acrylic acid copolymer, and acrylonitrile-vinyl acetate copolymer.

Examples of the polyether-based polymer include at least one selected from the group consisting of polyethylene oxide, and ethylene oxide-propylene oxide copolymer.

As the polymer, for example, at least one selected from the group consisting of the polymeric compounds exemplified as a retainer for retaining the electrolytic solution, having one or two or more groups substituted with a polar group may be used.

The compound having one or two or more polar groups may have, for example, a chained form or a branched form. The polar group may be provided at a terminal of the compound, or may be provided in a side chain of the compound, or may be provided both at a terminal and in a side chain of the compound.

The content of the compound having one or two or more polar groups is preferably 2 parts by weight or more and 5 parts by weight or less per 100 parts by weight of inorganic particles. When the content of the compound is 2% by weight or more, the dispersibility of inorganic particles in the step of forming the electrolyte layer 24 can be particularly improved. On the other hand, if the content of the compound exceeds 5 parts by weight, the effect of improving the dispersibility of inorganic particles decreases, and the effect of improving the storage characteristics and float characteristics can deteriorate.

In the battery having the above-mentioned configuration, when charging is performed, for example, lithium ions are released from the cathode active material layer 21B, and occluded in the anode active material layer 22B via the electrolyte layer 24. When discharging is performed, for example, lithium ions are released from the anode active material layer 22B, and occluded in the cathode active material layer 21B via the electrolyte layer 24.

Hereinafter, one exemplary method for producing a battery according to one embodiment of the present technology is described.

The cathode 21 is manufactured in the following manner. First, for example, a cathode active material, a binder, and a conducting agent are mixed to prepare a cathode mixture, and the cathode mixture is dispersed in a solvent such as N-methyl-2-pyrrolidone (NMP) to prepare a pasty cathode mixture slurry. Then, the cathode mixture slurry is applied on both sides of the cathode collector 21A and the solvent is dried, and compression molding with a roll pressing machine or the like is conducted to form the cathode active material layer 21B, and thus the cathode 21 is obtained.

The anode 22 is manufactured in the following manner. First, for example, an anode active material, and a binder are mixed to prepare an anode mixture, and the anode mixture is dispersed in a solvent such as N-methyl-2-pyrrolidone to prepare a pasty anode mixture slurry. Then, the anode mixture slurry is applied on both sides of the anode collector 22A and the solvent is dried, and compression molding with a roll pressing machine or the like is conducted to form the anode active material layer 22B, and thus the anode 22 is obtained.

The electrolyte layer 24 is manufactured in the following manner. First, for example, 25 to 35 parts by weight of an electrolytic solution, 1 to 3 parts by weight of a polymeric compound serving as a retainer that retains the electrolytic solution, 0.3 to 7.0 parts by weight of inorganic particles, 55 to 70 parts by weight of an organic solvent, and a compound having one or two or more polar groups (2 to 5 parts by weight per 100 parts by weight of inorganic particles) are mixed to obtain a mixed solution. Then, by heating and stirring the mixed solution, for example, with a homogenizer, the polymeric compound is dissolved, and the compound having a polar group is retained on the surface of the inorganic particles to prepare a sol-state precursor solution in which the inorganic particles are dispersed. At this time, the site that is electrically biased positively or negatively on the surface of the inorganic particles, and polar groups contained in the compound interact, and thus the compound having a polar group is retained on the surface of the inorganic particles as described above. Then, the precursor solution is uniformly applied and impregnated on both sides of the cathode 21 and the anode 22. Then, the diluting solvent is removed by vaporization to form the electrolyte layer 24.

The electrode body 20 is manufactured in the following manner. First, the cathode lead 11 is attached to an end part of the cathode collector 21A by welding, and the anode lead 12 is attached to an end part of the anode collector 22A by welding. Then, the cathode 21 and the anode 22 on which the electrolyte layer 24 is formed are laminated with the separator 23 interposed therebetween to give a laminate, and the laminate is wound in the longitudinal direction, and the protective tape 25 is adhered to the outermost periphery to give the electrode body 20.

The electrode body 20 is sealed with the packaging material 10 in the following manner. First, for example, the electrode body 20 is sandwiched between the packaging material 10 having flexibility. At this time, the close contact film 13 is inserted between the cathode lead 11 and the anode lead 12, and the packaging material 10. The close contact film 13 may be attached in advance to each of the cathode lead 11 and the anode lead 12. The packaging material 10 may be embossed in advance to form a recess for accommodating the electrode body 20. Then, the outer peripheral parts of the packaging materials 10 are brought into close contact with each other and sealed, for example, by thermal fusion bonding.

In this manner, the battery in which the electrode body 20 is accommodated in the packaging material 10 is obtained. After sealing, the battery may be molded by heat pressing as necessary.

In the battery according to one embodiment, since the compound having a polar group is retained on the surface of inorganic particles, it is possible to improve the dispersibility of inorganic particles in the step of forming the electrolyte layer 24, and control the occurrence of unevenness in the concentration of inorganic particles in the electrolyte layer 24. As a result, the site where the concentration of inorganic particles is locally low in the electrolyte layer 24 reduces, so that it is possible to control the occurrence of a micro short circuit. Therefore, it is possible to improve the battery characteristics such as storage characteristics and float characteristics.

In Application Example 1, an electronic device including the battery according to the above-mentioned one embodiment is described.

Figure 3:
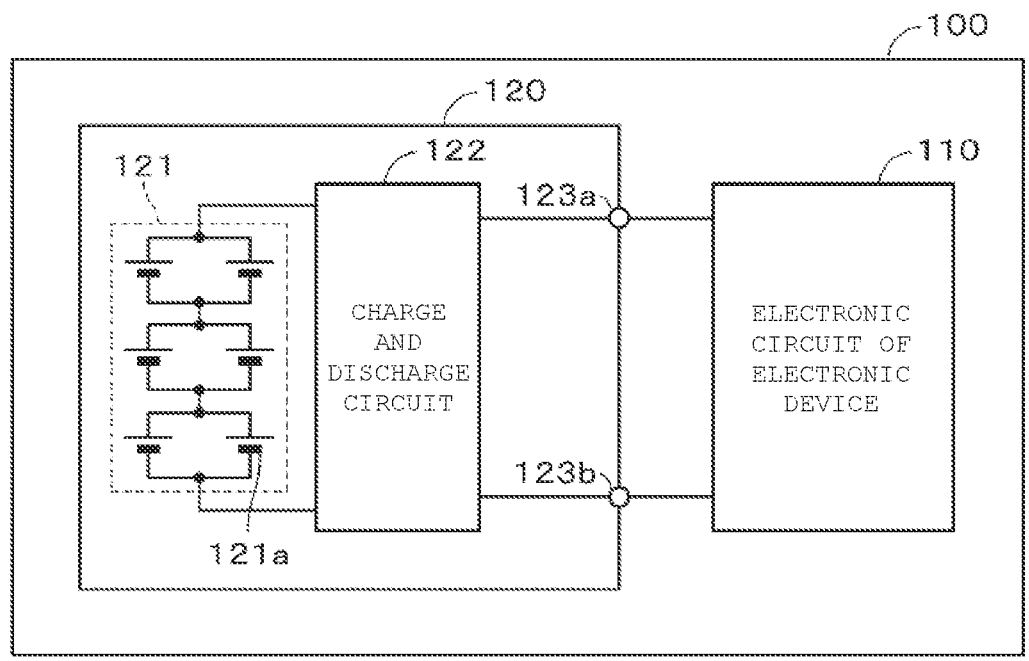
FIG. 3 is a block diagram showing one exemplary configuration of an electronic device according to an embodiment of the present technology.

FIG. 3 shows one exemplary configuration of an electronic device 100 as Application Example 1. The electronic device 100 includes an electronic circuit 110 of the electronic device body, and a battery pack 120. The battery pack 120 is electrically connected with the electronic circuit 110 via a cathode terminal 123a and an anode terminal 123b. The electronic device 100 may have such a configuration that the battery pack 120 is detachable.

Examples of the electronic device 100 include, but are not limited to, a notebook computer, a tablet computer, a cellular phone (e.g., smartphone, etc.), a portable information terminal (Personal Digital Assistants: PDA), a display device (LCD (Liquid Crystal Display), EL (Electro Luminescence) display, electronic paper, etc.), an imaging device (e.g., digital still camera, digital video camera, etc.), audio equipment (e.g., portable audio player), a game device, a cordless handset, an electronic book, an electronic dictionary, a radio, a headphone, a navigation system, a memory card, a pacemaker, a hearing aid, a power tool, an electric shaver, a refrigerator, an air conditioner, a television set, a stereo, a water heater, a microwave oven, a dishwasher, a washing machine, a dryer, lighting equipment, a toy, medical equipment, a robot, a road conditioner and a traffic light.

The electronic circuit 110 includes, for example, a CPU (Central Processing Unit) or processor, a peripheral logic part, an interface part, and a storage part, and controls the whole of the electronic device 100.

The battery pack 120 includes an assembled battery 121, and a charge and discharge circuit 122 (controller). The battery pack 120 may further include a packaging material (not shown) that accommodates the assembled battery 121 and the charge and discharge circuit 122 as necessary.

The assembled battery 121 is configured by a plurality of secondary batteries 121a that are connected in series and/or in parallel. The plurality of secondary batteries 121a are connected in such a manner that n batteries are connected in parallel and m batteries are connected in series (n and m each are a positive integer). FIG. 3 shows the example in which six secondary batteries 121a are connected in such a manner that two batteries are connected in parallel and three batteries are connected in series (2P3S). As the secondary battery 121a, the battery according to the above-mentioned one embodiment is used.

While the case where the battery pack 120 includes the assembled battery 121 made up of the plurality of secondary batteries 121a is described herein, a configuration in which the battery pack 120 includes only one secondary battery 121a instead of the assembled battery 121 may be employed.

The charge and discharge circuit 122 is a controller that controls charge and discharge of the assembled battery 121. The charge and discharge circuit 122 may include, for example, a CPU or processor, a current source, a resistor and/or a capacitor. Specifically, at the time of charging, the charge and discharge circuit 122 controls charging for the assembled battery 121. On the other hand, at the time of discharging (namely, during use of the electronic device 100), the charge and discharge circuit 122 controls discharging for the electronic device 100. The controller may include, for example, a CPU, a processor and/or the like.

As the packaging material, a casing configured, for example, by metal, polymeric resin or a composite material thereof may be used. Examples of the composite material include a laminate in which a metallic layer and a polymeric resin layer are laminated.

In Application Example 2, an electric vehicle including the battery according to the above-mentioned one embodiment is described.

Figure 4:
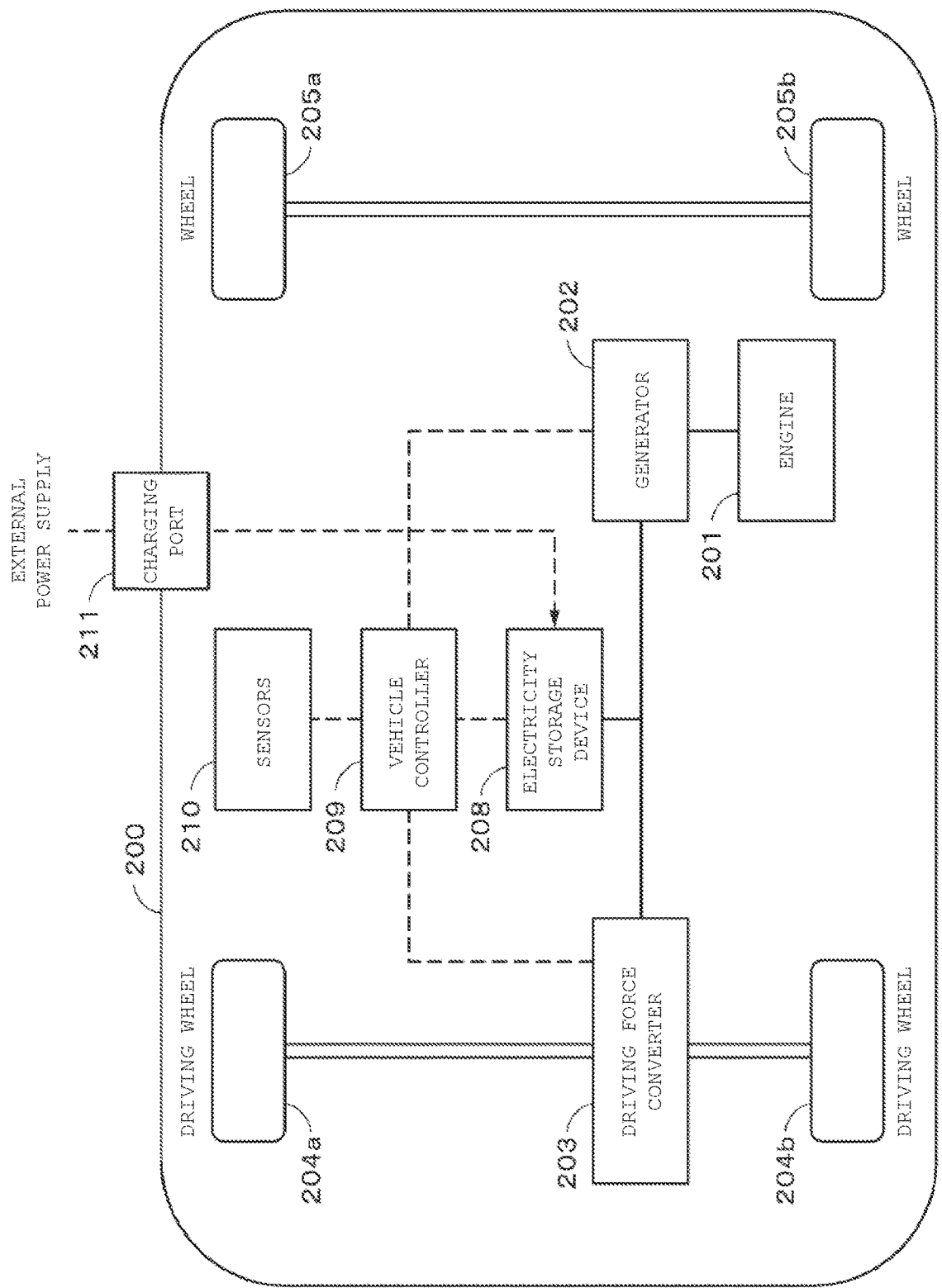
FIG. 4 is a schematic view showing one exemplary configuration of an electric vehicle according to an embodiment of the present technology.

FIG. 4 shows one exemplary configuration of a hybrid vehicle 200 as Application Example 2.

The hybrid vehicle 200 employs a series hybrid system as an electricity storage system for electric vehicle. The series hybrid system is a system travelling with an electric power-to-driving force converter using electric power generated by an engine-driven generator, or electric power that is generated by the engine-driven generator and temporarily stored in the battery.

The hybrid vehicle 200 is equipped with an engine 201, a generator 202, an electric power-to-driving force converter 203, a driving wheel 204a, a driving wheel 204b, a wheel 205a, a wheel 205b, an electricity storage device 208, a vehicle controller 209, sensors 210 and a charging port 211. The electricity storage device 208 includes one or two or more batteries according to the above-mentioned one embodiment.

The hybrid vehicle 200 is powered by the electric power-to-driving force converter 203. One example of the electric power-to-driving force converter 203 is a motor. The electric power-to-driving force converter 203 operates by the electric power of the electricity storage device 208, and the torque of the electric power-to-driving force converter 203 is transmitted to the driving wheels 204a, 204b. By using direct current to alternating current (DC-AC) conversion or inversion (AC-DC conversion) at a required spot, both an AC motor and a DC motor are usable as the electric power-to-driving force converter 203. The sensors 210 control the engine speed via the vehicle controller 209, and control the opening (throttle opening) of the unillustrated throttle valve. The sensors 210 include a speed sensor, an acceleration sensor, and an engine speed sensor.

The torque of the engine 201 is transmitted to the generator 202, and electric power generated from the torque by the generator 202 can be stored in the electricity storage device 208.

As the hybrid vehicle decelerates by the unillustrated braking system, the resistance at the time of deceleration is added to the electric power-to-driving force converter 203 as torque, and regenerated energy generated from the torque by the electric power-to-driving force converter 203 is stored in the electricity storage device 208.

The electricity storage device 208 receives electric power supply from an external power supply through the charging port 211 as an input port by being connected with the external power supply via the charging port 211, and is capable of storing the received electric power.

Although not illustrated, an information processing device including a processor or a CPU (Central Processing Unit) that conducts information processing regarding the vehicle control on the basis of the information concerning the secondary battery may be provided. Examples of such an information processing device include an information processing device that indicates a remaining battery level on the basis of the information concerning the remaining battery level.

In the above application example, description was given for the series hybrid vehicle that travels with a motor using electric power generated by the engine-driven generator, or electric power generated by the engine-driven generator and temporarily stored in the battery, however, it is to be noted that the vehicle in which the battery according to the present technology is usable is not limited to the vehicle described above. For example, the vehicle may be a parallel hybrid vehicle that uses an engine and a motor as a driving source and appropriately switches the mode among the three modes: travelling only with the engine, travelling only with the motor, and travelling with the engine and the motor, or may be an electric vehicle that travels by the drive of only the driving motor without using an engine.

In Application Example 3, a residential electricity storage system including the battery according to the above-mentioned one embodiment is described.

Figure 5:
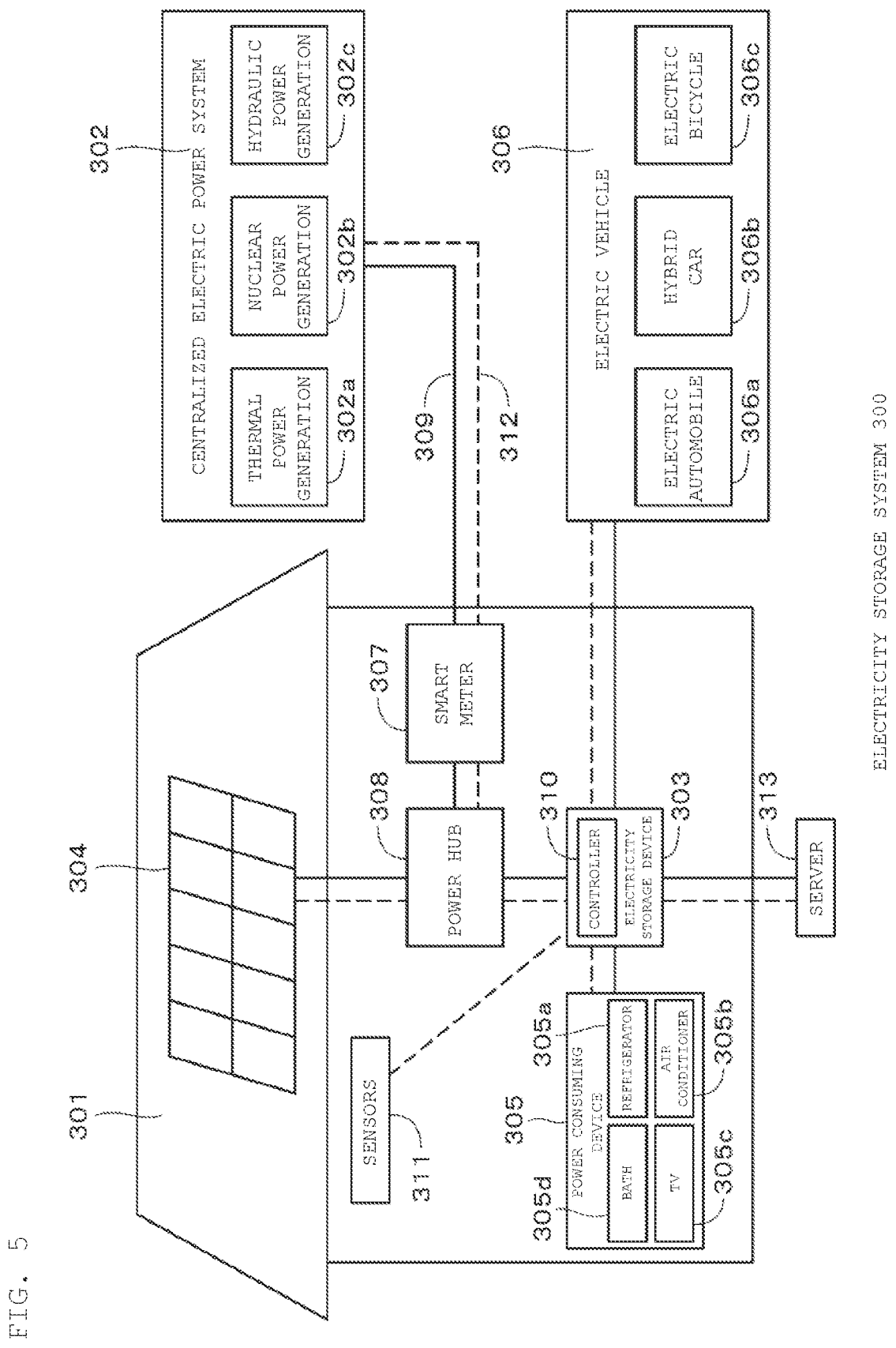
FIG. 5 is a schematic view showing one exemplary configuration of an electricity storage system according to an embodiment of the present technology.

FIG. 5 shows one exemplary configuration of an electricity storage system as Application Example 3. In an electricity storage system 300 for a residence 301, electric power is supplied to an electricity storage device 303 from a centralized electric power system 302 such as thermal power generation 302a, nuclear power generation 302b, or hydraulic power generation 302c via a power network 309, an information network 312, a smart meter 307, a power hub 308 and the like. In conjunction with this, electric power is supplied to the electricity storage device 303 from an independent source such as a home generating device 304. The electric power supplied to the electricity storage device 303 is stored. Electric power to be used in the residence 301 is supplied by using the electricity storage device 303. For a building besides the residence 301, a similar electricity storage system can be used.

The residence 301 is provided with the home generating device 304, a power consuming device 305, the electricity storage device 303, a controller 310 that controls devices, the smart meter 307, and sensors 311 that acquires various information. The devices are connected by means of the power network 309 and the information network 312. As the home generating device 304, a solar cell, a fuel cell or the like is used, and the generated electric power is supplied to the power consuming device 305 and/or the electricity storage device 303. The power consuming device 305 is a refrigerator 305a, an air conditioner 305b, a television receiver 305c, a bath 305d or the like. The power consuming device 305 includes an electric vehicle 306. The electric vehicle 306 is an electric automobile 306a, a hybrid car 306b, or an electric bicycle 306c.

The electricity storage device 303 includes one or two or more batteries according to the above-mentioned one embodiment. The smart meter 307 has a function of measuring the used amount of commercial power, and sending the measured used amount to an electric power company. The power network 309 may be one or a combination of direct current power supply, alternating current power supply, and non-contact power supply.

The sensors 311 are, for example, a motion sensor, a light intensity sensor, an object detection sensor, a power consumption sensor, a vibration sensor, a contact sensor, a temperature sensor, an infrared sensor and the like. Information acquired by each of the sensors 311 is sent to the controller 310. The weather condition, human condition and the like are grasped by the information from the sensors 311, and the energy consumption can be minimized by automatically controlling the power consuming device 305. Further, the controller 310 is capable of sending information concerning the residence 301 to an external electric power company via the Internet.

The power hub 308 conducts branching of the power line, DC-AC conversion and the like processes. As the communication mode of the information network 312 connected with the controller 310, a method of using a communication interface such as UART (Universal Asynchronous Receiver-Transmitter: sending and receiving circuit for asynchronous serial communication), and a method of using a sensor network according to wireless communication standards such as Bluetooth (registered tradename), ZigBee (registered tradename), and Wi-Fi are known. Bluetooth (registered tradename) mode is applied to multimedia communication, and enables communication of point-to-multipoint connection. ZigBee (registered tradename) uses the physical layer of IEEE (Institute of Electrical and Electronics Engineers) 802.15.4. IEEE802.15.4 is a name of a short-range wireless network standard that is called PAN (Personal Area Network) or W(Wireless)PAN.

The controller 310 is connected with an external server 313. The server 313 may be managed by any one of the residence 301, an electric power company, or a service provider. Information sent and received by the server 313 is, for example, power consumption information, life pattern information, power rates, weather information, natural disaster information, and information concerning power trade. These pieces of information may be sent and received to/from a home power consuming device (e.g., television receiver), or may be sent and received to/from an out-of-home device (e.g., cellular phone). These pieces of information may be displayed on an apparatus having a displaying function, for example, a television receiver, a cellular phone, a PDA (Personal Digital Assistants) and the like.

The controller 310 that controls various parts is configured by a CPU (Central Processing Unit) or processor, a RAM (Random Access Memory), a ROM (Read Only Memory) and so on, and is hosed in the electricity storage device 303 in the present example. The controller 310 is connected with the electricity storage device 303, the home generating device 304, the power consuming device 305, the sensors 311, and the server 313 by the information network 312, and has a function of modulating, for example, the use amount of the commercial power and the amount of generating power. Besides the above, a function of conducting power trade in the power market and the like may be provided.

As described above, not only the electric power of the centralized electric power system 302 such as the thermal power generation 302a, the nuclear power generation 302b, or the hydraulic power generation 302c, but also the electric power generated by the home generating device 304 (photovoltaic power generation, wind power generation) can be stored in the electricity storage device 303.

Therefore, when the electric power generated by the home generating device 304 varies, the control of making the electric energy to be delivered to the outside constant, or the control of discharging as much as needed can be conducted. For example, the electric power may be used in such a manner that the electric power obtained by photovoltaic power generation is stored in the electricity storage device 303, low-rate midnight electric power is stored in the electricity storage device 303 at night time, and the electric power stored by the electricity storage device 303 is discharged and used during high-rate daytime hours.

While the case of housing the controller 310 in the electricity storage device 303 has been described in this example, the controller 310 may be housed in the smart meter 307, or may be configured alone. Further, the electricity storage system 300 may be used for a plurality of families in a multi-family dwelling, or for a plurality of detached houses.

Hereinafter, the present technology is specifically described by way of examples, however, it is to be noted that the present technology is not limited only to these examples.

In the following examples and comparative examples, weight average molecular weight of a copolymer is determined by gel permeation chromatography.

Example 1

First, as a cathode active material, 96 parts by weight of $LiCoO_2$, 3 parts by weight of polyvinylidene fluoride (PVdF) as a cathode binder, and 1 part by weight of carbon black as a cathode conducting agent were mixed to give a cathode mixture. Then, the cathode mixture was dispersed in an organic solvent (N-methyl-2-pyrrolidone) to give a pasty cathode mixture slurry. Then, the cathode mixture slurry was applied on both sides of the cathode collector (15 μm-thick aluminum foil) using a coating device, and the cathode mixture slurry was dried to form a cathode active material layer. Then, after compression molding the cathode active material layer using a roll pressing machine, the cathode collector on which the cathode active material layer was formed was cut to into a strip of 48 mm×300 mm.

First, as n anode active material, 90 parts by weight of artificial graphite, and 10 parts by weight of polyvinylidene fluoride (PVdF) as an anode binder were mixed to give an anode mixture. Then, the anode mixture was dispersed in an organic solvent (N-methyl-2-pyrrolidone) to give a pasty anode mixture slurry. Then, the anode mixture slurry was applied on both sides of the anode collector (15 μm-thick copper foil) using a coating device, and the anode mixture slurry was dried to form an anode active material layer. Then, after compression molding the anode active material layer using a roll pressing machine, the anode collector on which the anode active material layer was formed was cut to into a strip of 50 mm×310 mm.

First, ethylene carbonate (EC) and propylene carbonate (PC) were mixed in a weight ratio of EC:PC=50:50 to prepare a mixed solvent. Then, an electrolyte salt ($LiPF_6$) was dissolved in the mixed solvent in a concentration of 1 mol/kg to prepare an electrolytic solution. Then, 31 parts by weight of the electrolytic solution, 2 parts by weight of polyvinylidene fluoride (PVdF) as a polymeric compound, 0.45 parts by weight of alumina particles as inorganic particles, 66.55 parts by weight of dimethyl carbonate as an organic solvent, and a copolymer having a polar functional group (5 parts by weight per 100 parts by weight of inorganic particles) were mixed to obtain a mixed solution. As the copolymer having a polar functional group, polyvinylidene fluoride having a weight average molecular weight of 900000 in which part of functional groups is substituted with a carboxylate group (polar functional group) was used.

Then, by heating and stirring (80° C., stirring time 30 minutes to 1 hour) the mixed solution with a homogenizer, a sol-state precursor solution in which the polymeric compound was dissolved, and the inorganic particles were dispersed was prepared. At this time, by the interaction between the polar functional group such as a hydroxy group on the surface of inorganic particles and the polar functional group of the copolymer, the copolymer containing the polar functional group was adsorbed and retained on the surface of the inorganic particles. Then, after applying the precursor solution on both sides of the cathode and the anode, the precursor solution was dried to form a gel-state electrolyte layer.

First, a cathode lead was welded to the cathode collector, and an anode lead was welded to the anode collector. Then, the cathode and the anode each having the electrolyte layer formed thereon were laminated with a separator (23 μm-thick microporous polypropylene film) interposed therebetween, and then the laminate was wound in the longitudinal direction, and a protective tape was bonded on the outermost periphery to obtain a winding-type electrode body.

First, the packaging material was folded up in such a manner that the electrode body 20 was sandwiched between the flexible packaging materials. At this time, a close contact film was inserted between the cathode lead and the packaging material, and a close contact film was inserted between the anode lead and the packaging material. Then, by thermal fusion bonding the outer peripheral parts of the folded packaging material, the electrode body was encapsulated by the packaging material. In this manner, the objective battery was obtained.

Example 2

A battery was obtained in the same manner as in Example 1 except that in the electrolyte layer forming step, a vinylidene fluoride-based copolymer in which part of functional groups is substituted with a carboxylic group and having a weight average molecular weight of 900000 was used as a copolymer containing a polar functional group.

Example 3

A battery was obtained in the same manner as in Example 1 except that in the electrolyte layer forming step, a polyether-based polymer in which part of functional groups is substituted with a phosphoric group and having a weight average molecular weight of 30000 was used as a copolymer containing a polar functional group.

Example 4

A battery was obtained in the same manner as in Example 1 except that in the electrolyte layer forming step, a polyether-based polymer in which part of functional groups is substituted with a sulfonate group and having a weight average molecular weight of 300000 was used as a copolymer containing a polar functional group.

Example 4

A battery was obtained in the same manner as in Example 1 except that in the electrolyte layer forming step, a polyether-based polymer in which part of functional groups is substituted with an amino group and having a weight average molecular weight of 300000 was used as a copolymer containing a polar functional group.

Comparative Example 1

A battery was obtained in the same manner as in Example 1 except that in the electrolyte layer forming step, a mixed solution was obtained without adding a copolymer having a polar functional group.

Comparative Example 2

A battery was obtained in the same manner as in Example 1 except that in the electrolyte layer forming step, a copolymer free of a polar functional group was used in place of the copolymer having a polar functional group. As the copolymer free of a polar functional group, a vinylidene fluoride-based polymer having a weight average molecular weight of 600000 was used.

In the above-mentioned manufacturing step of the electrolyte layer, the manufactured gel-state electrolyte layer was sampled and observed under an optical microscope. As a result, in the electrolyte layer to which a copolymer having a polar functional group was not added (Comparative Examples 1, 2), a larger agglomerate of inorganic particles was observed in comparison with the electrolyte layer to which a copolymer having a polar functional group was added (Examples 1 to 5).

Figure 6:
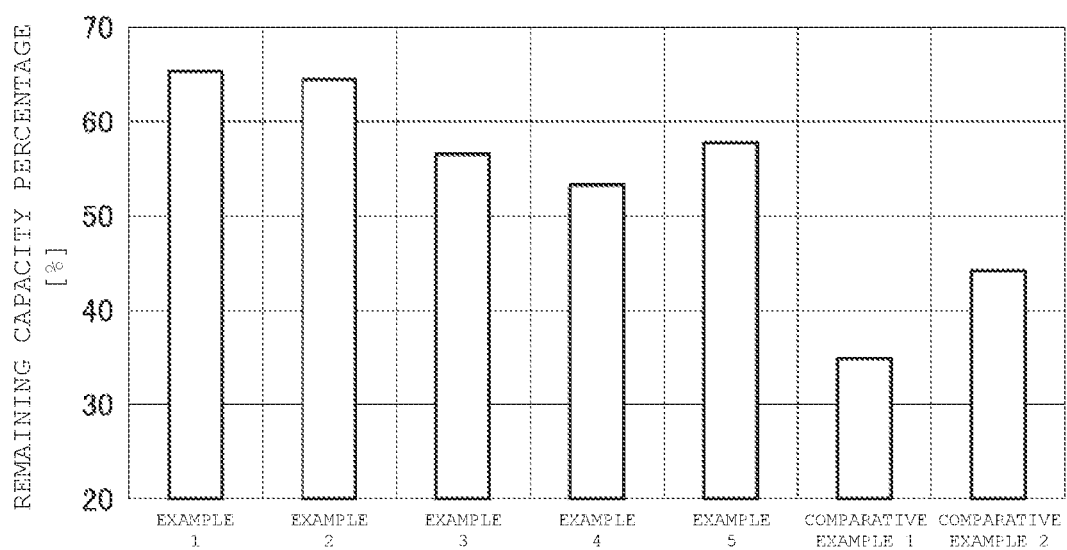
FIG. 6 is a graph showing the remaining capacity percentage in a 70° C. storage test according to an embodiment of the present technology.

For the battery obtained in the manner as described above, a remaining capacity percentage in the 70° C. storage test was determined in the following manner. First, the battery was charged to 4.4 V, and then discharged, and a battery capacity (discharge capacity) before the storage test was determined. Subsequently, the battery was charged again to 4.4 V, and stored for 14 days in a constant temperature oven at 70° C., and then the battery was discharged, and the battery capacity (discharge capacity) was determined. Then, a remaining capacity percentage was determined according to the following formula. The result is shown in Table 1 and FIG. 6.

Remaining capacity percentage [%]=((Battery capacity after storage test)/(Battery capacity before storage test))×100

Figure 7:
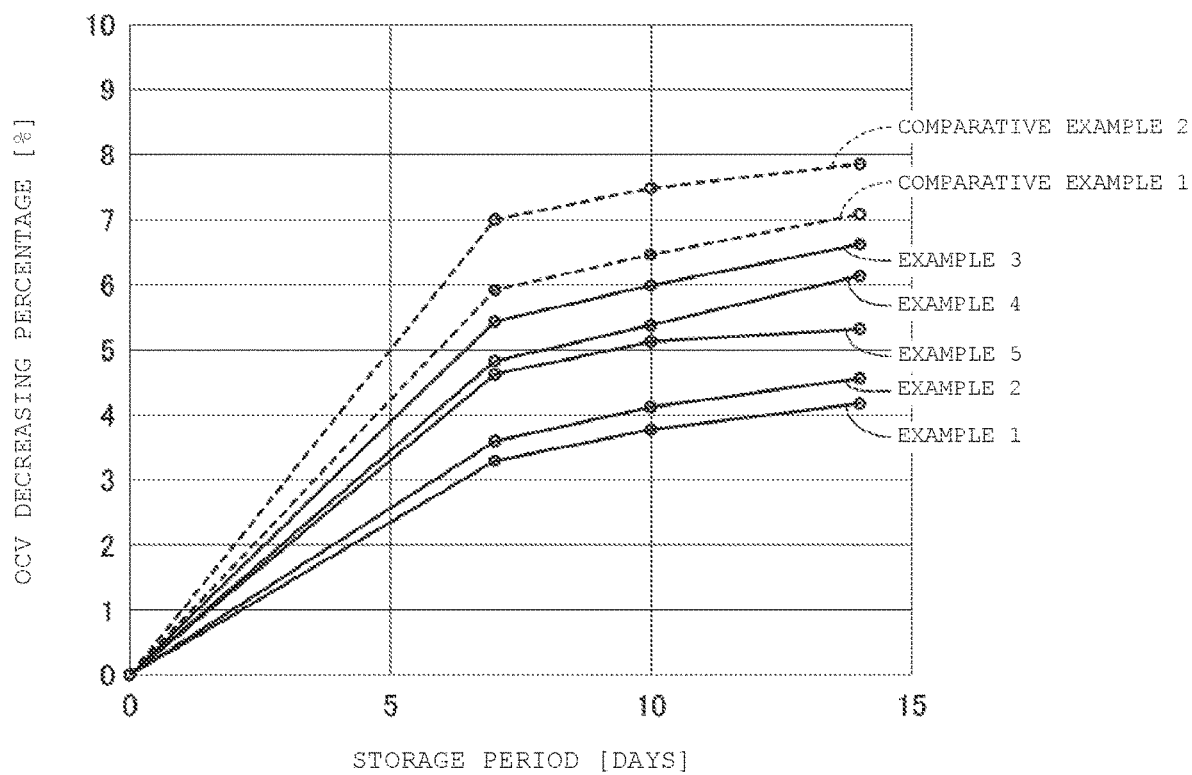
FIG. 7 is a graph showing the OCV decreasing percentage in a 70° C. storage test according to an embodiment of the present technology.

Also, for the battery obtained in the manner as described above, an OCV (Open Circuit Voltage) decreasing percentage in the 70° C. storage test was determined in the following manner. First, the battery was charged to 4.4 V. and an initial OCV was measured. Subsequently, the battery was stored in a constant temperature oven at 70° C., and an OCV after storage for a predetermined period was measured. Then, a OCV decreasing percentage for each storage period was determined according to the following formula. The result is shown in Table 1 and FIG. 7.

OCV decreasing percentage [%]=(((Initial OCV)−(OCV after storage for predetermined period))/(Initial OCV))×100

(65° C. Float Test)

For the battery obtained in the manner as described above, a swelling percentage was determined in the following manner. First, the battery was charged at 1.14 mA to 4.4 V, and initial battery volume was measured. Subsequently, the charged battery was conveyed to a constant temperature oven, and charging in the conditions of 4.4V, 0.285 mA was continued in the constant temperature oven at 65° C., and then battery volume after a lapse of three days from the start of the test was measured. Then, a swelling percentage after the float test was determined according to the following formula. The result is shown in Table 1.

Swelling percentage [%]=((Battery volume after three days)/(Initial battery volume))×100

Table 1 shows configurations and evaluation results of the batteries of Examples 1 to 5, and Comparative Examples 1, 2.

TABLE 1

| | Polymeric compound | Inorganic particles | Polar functional group in copolymer (main ingredient of copolymer/weight average molecular weight) | Remaining capacity percentage | OCV decreasing percentage | Swelling percentage |
|---|---|---|---|---|---|---|
| Example 1 | PVdF | Alumina | Carboxylate group (VdF-based polymer/900000) | 65.3 | 4.17 | 0 |
| Example 2 | PVdF | Alumina | Carboxylic group (VdF-based polymer/900000) | 64.4 | 4.56 | 0 |
| Example 3 | PVdF | Alumina | Phosphoric group (polyether-based polymer/30000) | 56.6 | 6.62 | 0 |
| Example 4 | PVdF | Alumina | Sulfonate group (polyether-based polymer/300000) | 53.2 | 6.14 | 0 |
| Example 5 | PVdF | Alumina | Amino group (polyether-based polymer/300000) | 57.8 | 5.32 | 0 |
| Comparative Example 1 | PVdF | Alumina | Not added | 34.8 | 7.85 | 17.8 |
| Comparative Example 2 | PVdF | Alumina | Non-polar (VdF-based polymer/600000) | 44.2 | 7.08 | 26.9 |

PVdF: polyvinylidene fluoride
Vdf: vinylidene fluoride

In the batteries of Examples 1 to 5 in which a copolymer having a polar functional group is added to a mixed solution for forming an electrolyte layer to make the copolymer be retained on the surface of inorganic particles, it is possible to check decrease in the OCV, and to improve the remaining capacity percentage in the storage test. Also, it is possible to check the increase in the swelling percentage in the float test. In particular, in Examples 1, 2 in which a carboxylate group or a carboxylic group is added as a polar functional group, the effect of checking decrease in the OCV and improving the remaining capacity percentage is significant.

Check of decrease in the OCV and improvement in the remaining capacity percentage in the storage test owes to the following reason. That is, by retaining the copolymer on the surface of inorganic particles, dispersibility of the inorganic particles in the coating of the precursor solution improves due to the steric hindrance of the copolymer in the manufacturing step of the electrolyte layer. Therefore, unevenness in the concentration of inorganic particles in the gel-state electrolyte layer is suppressed, and a micro short circuit in the storage test is reduced. As a result, decrease in the OCV is checked, and the remaining capacity percentage improves.

Check of the increase in the swelling percentage in the float test is ascribable to that flow of the electric current is uniformed by suppressing unevenness in the concentration of inorganic particles in the gel-state electrolyte layer, and decomposition of the electrolytic solution is inhibited.

In the battery of Comparative Example 1 in which a copolymer containing a polar functional group is not added to the mixed solution for forming an electrolyte layer, and in the battery of Comparative Example 2 in which a copolymer free of a polar functional group is added to the mixed solution for forming an electrolyte layer, the OCV decreases and the remaining capacity percentage decreases in the storage test. Also, the swelling percentage increases in the float test.

Decrease in the OCV and decrease in the remaining capacity percentage in the storage test owe to the following reason. That is, since a copolymer is not retained on the surface of the inorganic particles, dispersibility of the inorganic particles in the coating of the precursor solution impairs, and unevenness is generated in the concentration of inorganic particles in the gel-state electrolyte layer, and a site that is locally low in concentration of inorganic particles is generated in the manufacturing step of the electrolyte layer. Therefore, in the site where the concentration of inorganic particles of gel-state electrolyte is low, the resistance is low, and a micro short circuit occurs in the storage test. As a result, the OCV decreases, and the remaining capacity percentage decreases.

Increase in the swelling percentage in the float test owes to the following reason. That is, as a result of occurrence of unevenness in the concentration of inorganic particles in the gel-state electrolyte layer as described above, the electric current flows well in the site where the concentration of inorganic particles is low in the electrolyte layer. Accordingly, decomposition reaction of the electrolytic solution is accelerated, and gas is generated, so that the battery swells.

While the embodiment, application examples, and examples of the present technology have been specifically described, the present technology is not limited to the embodiment, application examples, and examples described above, but various modifications based on the technical idea of the present technology are possible.

For example, configurations, methods, steps, shapes, materials, numerical values and the like recited in the above embodiment, application examples, and examples are merely illustrative, and different configurations, methods, steps, shapes, materials, numerical values and the like may be used as necessary. Chemical formulas of compounds and the like are representative, and compounds having the same general name are not limited to those having the described valence and the like.

Configurations, methods, steps, shapes, materials, numerical values and the like of the above embodiment, application examples, and examples may be mutually combined without departing from the scope of the present technology.

In the above embodiment, application examples and examples, description was given for a laminate-type battery as an example, however, the shape of the battery is not limited to this, and the present technology may also be applied to various shapes including a cylindrical shape, a square shape, a coin shape and a button shape. The present technology may also be applied to a flexible battery or the like incorporated in a wearable terminal such as a smart watch and a head mount display.

In the above embodiment and examples, description was given for the case where the present technology is applied to a winding-type battery, however, the structure of the battery is not limited to this, and the present technology is applicable also to, for example, a laminated battery (stacked battery) in which a cathode and an anode are laminated with a separator interposed therebetween, or a battery in which a cathode and an anode sandwiching a separator is folded.

Also, in the above embodiment and examples, description was given for the case where a precursor solution is applied on both sides of a cathode and an anode to form an electrolyte layer, however, a precursor solution may be applied on both sides of a separator to form an electrolyte layer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
   a cathode;
   an anode; and
   an electrolyte layer having a gel state,
   wherein the electrolyte layer containing:
   an electrolytic solution;
   a first polymeric compound configured to retain the electrolytic solution;
   inorganic particles, and
   a second polymeric compound retained on a surface of the inorganic particles,
   the first polymeric compound includes a vinylidene fluoride-based polymer,
   the second polymeric compound includes at least one polymer selected from the group consisting of the vinylidene fluoride-based polymer, an acrylonitrile-based polymer, and a polyether-based polymer, having one or two or more groups substituted with a polar group, and
   the polar group is at least one selected from the group consisting of a carboxylic group, a phosphoric group, a sulfonic group, a carboxylate group, a phosphate group, a sulfonate group, an amide group, an amino group, a hydroxy group, an ether group, and combinations thereof.

2. The battery according to claim 1, wherein the second polymeric compound has a weight average molecular weight from 30000 to 2000000.

3. The battery according to claim 1, wherein the inorganic particles include aluminum oxide.

4. The battery according to claim 1, wherein
   the inorganic particles have a site that is electrically biased positively or negatively on the surface, and
   the site electrically biased positively or negatively and the one or two or more groups substituted with the polar group of the second polymeric compound interact with each other, so that the second polymeric compound having the polar group is retained on the surface of the inorganic particles.

5. A battery pack comprising:
   the battery according to claim 1; and
   a controller that controls the battery.

6. An electronic device comprising the battery according to claim 1, wherein the electronic device is configured to be supplied with electric power from the battery.

7. An electric vehicle comprising:
   the battery according to claim 1, and
   a converter that converts electric power supplied from the battery to a driving force of the electric vehicle.

8. The electric vehicle according to claim 7, further comprising a processor that conducts information processing regarding vehicle control according to information of the battery.

9. An electric power system comprising the battery according to claim 1, wherein the electric power system is configured to be supplied with electric power from the battery.

10. The battery according to claim 1, wherein
    the inorganic particles include at least one of inorganic compound particles and metallic particles,
    the inorganic compound particles contain at least one selected from the group consisting of aluminum oxide, boehmite, magnesium oxide, titanium oxide, zirconium oxide, silicon oxide, yttrium oxide, silicon nitride, aluminum nitride, boron nitride, titanium nitride, silicon carbide, boron carbide, porous aluminosilicate, lamellar silicate, barium titanate, and strontium titanate, and
    the metallic particles contain at least one selected from the group consisting of Ag, Pt, Au, Ni, Cu, Pd, Al, Fe, Co, and Si.

* * * * *